United States Patent
Hidaka et al.

(10) Patent No.: US 8,404,604 B2
(45) Date of Patent: Mar. 26, 2013

(54) OPTICAL GLASS

(75) Inventors: Tatsuo Hidaka, Hyogo (JP); Junichi Nakamura, Hyogo (JP); Yoshitaka Mayumi, Hyogo (JP); Hidekazu Hashima, Hyogo (JP); Kohei Fukumi, Osaka (JP); Naoyuki Kitamura, Osaka (JP); Junji Nishii, Osaka (JP)

(73) Assignees: Nihon Yamamura Glass Co., Ltd. (JP); National Institute of Advanced Industrial Science and Technology (JP)

( * ) Notice: Subject to any disclaimer, the term of this patent is extended or adjusted under 35 U.S.C. 154(b) by 185 days.

(21) Appl. No.: 12/866,559

(22) PCT Filed: Feb. 9, 2009

(86) PCT No.: PCT/JP2009/052134
§ 371 (c)(1),
(2), (4) Date: Aug. 6, 2010

(87) PCT Pub. No.: WO2009/099230
PCT Pub. Date: Aug. 13, 2009

(65) Prior Publication Data
US 2010/0317504 A1 Dec. 16, 2010

(30) Foreign Application Priority Data

Feb. 8, 2008 (JP) .................. 2008-029537

(51) Int. Cl.
*C03C 3/247* (2006.01)
*C03C 3/19* (2006.01)
(52) U.S. Cl. ............... 501/44; 501/45; 501/46; 501/47; 501/48
(58) Field of Classification Search ............ 501/44, 501/45, 46, 47, 48
See application file for complete search history.

(56) References Cited

U.S. PATENT DOCUMENTS

| 4,108,673 | A | * | 8/1978 | Toratani et al. | 501/46 |
| 4,439,530 | A | * | 3/1984 | Tajima | 501/45 |
| 7,157,391 | B2 | * | 1/2007 | Kasuga et al. | 501/45 |
| 7,892,998 | B2 | * | 2/2011 | Oogaki | 501/46 |
| 2004/0138043 | A1 | | 7/2004 | Kasuga et al. | |
| 2005/0003948 | A1 | * | 1/2005 | Yamazaki | 501/45 |
| 2005/0032621 | A1 | * | 2/2005 | Zou et al. | 501/46 |
| 2009/0275460 | A1 | * | 11/2009 | Miyata | 501/45 |
| 2009/0314033 | A1 | * | 12/2009 | Zou et al. | 65/60.1 |

FOREIGN PATENT DOCUMENTS

| JP | 60171244 A | | 9/1985 |
| JP | 11139845 A | | 5/1999 |
| JP | 2003238197 A | * | 8/2003 |
| JP | 2004168593 A | * | 6/2004 |
| JP | 2004217513 A | | 8/2004 |
| JP | 200770194 A | | 3/2007 |
| JP | 200913026 A | | 1/2009 |
| WO | WO 2007/061129 A1 | * | 5/2007 |
| WO | WO 2007/114172 A1 | * | 10/2007 |

OTHER PUBLICATIONS

Machine Translation of JP 2007-070194 A, Mar. 22, 2007.*
Machine Translation of JP 11-139845 A, May 25, 1999.*

* cited by examiner

*Primary Examiner* — Karl Group
*Assistant Examiner* — Elizabeth A Bolden
(74) *Attorney, Agent, or Firm* — Bacon & Thomas, PLLC

(57) ABSTRACT

A $P_2O_5$—BaO—ZnO—$Nb_2O_5$ type optical glass contains 25-50 wt. % $P_2O_5$, 15-35 wt. % BaO, 1-25 wt. ZnO, and 3-10 wt. % $Nb_2O_5$. The optical glass has a high refractive index (particularly preferably the refractive index $n_d$ of 1.6 or more), low dispersion (an Abbe number $\upsilon_d$ of 42 or more), a low deformation point, and improved resistance to devitrification upon molding, and is suitable for precision-mold press molding or other molding processes and also suitable for transfer of a fine structure.

4 Claims, No Drawings

OPTICAL GLASS

TECHNICAL FIELD

The present invention relates to an optical glass, and more particularly to an optical glass which has a high refractive index ($n_d$), low dispersion, a low deformation point (At), and improved resistance to devitrification upon molding, and which has a composition suitable for molding and for transfer of a fine structure.

BACKGROUND ART

In the recent significant development of smaller-size and lighter-weight optical equipment, aspherical lenses have been used increasingly. The aspherical lens is advantageous in that aberration of light can readily be corrected and that the number of lenses can be decreased so as to allow reduction in size of the equipment.

For fabricating an aspherical lens or the like, a glass preform is softened by heating, which is then formed into a desired shape by precision-mold press molding. There are generally two ways of obtaining the preform: one is to cut a piece of glass out of a glass block or bar and process it into a preform, and the other is to drop a molten glass from a distal end of a nozzle so as to obtain a glass preform in the spherical form.

In order to obtain a molded product of glass by way of precision molding, it is necessary to press-mold the preform under the temperature condition near the deformation point (At). Therefore, when the preform has a higher deformation point (At), the mold coming into contact with the preform will be exposed to a higher temperature, causing the surface of the mold to suffer oxidization and corrosion. This gives rise to the need of maintenance of the mold, hindering mass production at a low cost. Accordingly, it is desired that the optical glass constituting the preform can be molded at a relatively low temperature, or, that it has a low glass transition point (Tg) and/or a low deformation point (At).

As to the glass used for a molded lens, a glass having various optical characteristics suitable for its specific use is demanded. In particular, there is an increasing demand for a glass having a high refractive index, low dispersion, and a low deformation point.

The conventional glasses satisfying the above-described optical characteristics include a barium flint glass. This not only contains PbO (lead oxide) hazardous to humans, but also poses other unfavorable problems. For example, metallic lead would be deposited on a surface of the product upon precision press molding, and a glass surface would be likely to become rough due to fusion with the mold.

In a digital camera, it is necessary to reduce the lens surface reflection as much as possible, and anti-reflection coating is used for that purpose. In order to restrict the reflectance as well as incident angle dependence and also to broaden the wavelength band, however, a considerable number of layers of coating films are required, resulting in complicated and expensive process steps.

As a way of achieving low reflectance without the coating films, it is known to form, on the surface of a lens or the like, a fine structure that is smaller in size than the wavelength of light. This may be done, for example, by nanoimprinting using a resin. A material having a low softening temperature such as a resin is relatively easy to form and shape using a microfabricated mold. However, temperature dependence of refractive index of the resin is about $-1 \times 10^{-4}$ (K), which is greater than that of the glass by two orders of magnitude. This means that for a part intended for higher image quality, the change in refractive index will affect the image quality more severely. In view of the foregoing, a glass for use in transferring a fine structure has been studied in order to achieve higher functionality of an optical part. A fine structure-transferred glass is an ultra-precision-mold press-molded product having a glass surface onto which the mold's concavo-convex pattern on the order of μm to nm has been transferred. For example, a conventional optical part may be replaced with a lens provided with such a fine structure so as to advantageously achieve a compact device with higher functionality at a reduced cost. A mold made up of Ni and P, which has conventionally been used primarily for molding a resin lens, may be used as well. As the characteristics required for the glass, it is crucially important that the deformation point is 500° C. or lower in order to restrict deterioration of the mold. Furthermore, in order to eliminate the need of a coating film on a lens, climate resistance of the glass itself is required as well.

As a glass free of PbO and having the above-described optical characteristics, a $P_2O_5$—$R^1_2O$—$R^2O$-(rare earth oxide or the like) type glass (where $R^1$: alkali metal oxide, and $R^2$: divalent metal oxide) has been disclosed. This optical glass has a refractive index ($n_d$) of 1.63 to 1.67, an Abbe number ($\nu_d$) of 47 to 59, and a deformation point (At) of 500° C. or lower (Patent Document 1).

There is also disclosed a $P_2O_5$—$R^1_2O$—BaO—ZnO-(high-valent oxide) type optical glass. This optical glass has a refractive index ($n_d$) of 1.52 to 1.7, and an Abbe number ($\nu_d$) of 42 to 70 (Patent Document 2).

Also disclosed are a $P_2O_5$—$R^1_2O$—$R^2O$—$Nb_2O_5$ type glass, a $P_2O_5$—$R^1_2O$—$Nb_2O_5$—$WO_3$ type glass, and a $P_2O_5$—$R^1_2O$—$Bi_2O_3$ type glass. These optical glasses each have a refractive index ($n_d$) of 1.57 or greater, and a deformation point (At) of 570° C. or lower (Patent Documents 3 to 7).

There are also disclosed a $P_2O_5$—$B_2O_3$—$R^1_2O$—$R^2O$—$Gd_2O_3$ type glass and a $P_2O_5$—$B_2O_3$—$R^1_2O$—BaO—ZnO type glass. These optical glasses each have a refractive index ($n_d$) of L54 or greater, and an Abbe number ($\nu_d$) of 57 or greater (Patent Documents 8 and 9).

Further disclosed is a $P_2O_5$—$R^1_2O$—$R^2O$—ZnO—$Al_2O_3$ type glass. This optical glass has a refractive index ($n_d$) of 1.55 to 1.65, an Abbe number ($\nu_d$) of 55 to 65, and a deformation point of 500° C. or lower (Patent Documents 10 to 12).

Patent Document 1: Japanese Patent Application Laid-Open No. 11-139845
Patent Document 2: Japanese Patent Application Laid-Open No. 2004-217513
Patent Document 3: Japanese Patent Application Laid-Open No. 2002-293572
Patent Document 4: Japanese Patent Application Laid-Open No. 2005-247659
Patent Document 5: Japanese Patent Application Laid-Open No. 2003-335549
Patent Document 6: Japanese Patent Application Laid-Open No. 2004-2153
Patent Document 7: Japanese Patent Application Laid-Open No. 2003-238197
Patent Document 8: Japanese Patent Application Laid-Open No. 2006-52119
Patent Document 9: WO 2003/072518
Patent Document 10: Japanese Patent Application Laid-Open No. 2004-168593
Patent Document 11: Japanese Patent Application Laid-Open No. 2004-262703
Patent Document 12: Japanese Patent Application Laid-Open No. 2005-53749

DISCLOSURE OF THE INVENTION

Problems to be Solved by the Invention

As for the optical glasses disclosed in Patent Documents 1 and 2 above, while they each have a high refractive index, low dispersion, and a low deformation point, the deformation point has been lowered by using an alkali metal oxide, a zinc oxide, or the like, which would be likely to result in poor climate resistance.

As for the optical glasses disclosed in Patent Documents 3 to 7 above, they each have high dispersion ($\upsilon_d \leqq 42$), and thus, they are unsuitable for applications requiring high refractive index and low dispersion.

As for the optical glasses disclosed in Patent Documents 8 and 9 above, while they each have a high refractive index and low dispersion, they each have a high deformation point of 500° C. or higher, which would adversely affect the surface of the mold.

As for the optical glasses disclosed in Patent Documents 10 to 12 above, they each have $Al_2O_3$ as an essential component for improved climate resistance. This leads to an increased melting temperature of the glass, possibly causing corrosion of a Pt crucible, which would be likely to result in a decrease in transmittance on the low-wavelength side.

In view of the foregoing, an object of the present invention is to provide an optical glass which can solve the above-described problems of the conventional phosphate based optical glasses, which has a high refractive index (in particular, a high refractive index of preferably 1.6 or greater), low dispersion (an Abbe number of 42 or greater), a low deformation point, and improved resistance to devitrification upon molding, and which is suitable for precision-mold press molding or other molding processes and also suitable for transfer of a fine structure.

Means for Solving the Problems

To solve the above-described problems, the inventors have vigorously carried out investigations, and found out that the above problems can be solved by fabricating a glass so as to have a composition falling within a specific range, specifically on the basis of a $P_2O_5$—BaO—ZnO—$Nb_2O_5$ type glass, by mixing alkali metal oxides as appropriate, by mixing rare earth oxides as appropriate, and by further adding fluorides, and they have finally completed the present invention.

Specifically, an optical glass according to the present invention has a first feature that it is a $P_2O_5$—BaO—ZnO—$Nb_2O_5$ type glass that contains: 25-50 wt. % $P_2O_5$, 15-35 wt. % BaO, 1-25 wt. ZnO, and 3-10 wt. % $Nb_2O_5$.

Further, the optical glass according to the present invention has, in addition to the first feature described above, a second feature that it contains: 0.1-8 wt. % $B_2O_3$ and 0.1-10 wt. % F.

Furthermore, the optical glass of the present invention has, in addition to the first or second feature described above, a third feature that it contains at least one of: 0-8 wt. % $GeO_2$, 0-1 wt. % $Al_2O_3$ (excluding 1 wt. %), 0-8 wt. % $Li_2O$, 0-10 wt. % $Na_2O$, 0-8 wt. % $K_2O$, 0-10 wt. % CaO, 0-15 wt. % SrO, 0-5 wt. % MgO, 0-10 wt. % $WO_3$, 0-8 wt. % $Gd_2O_3$, 0-8 wt. % $Ta_2O_5$, 0-5 wt. % $Y_2O_3$, 0-3 wt. % $ZrO_2$, 0-10 wt. % LiF, 0-10 wt. % NaF, 0-15 wt. % $ZnF_2$, and 0-15 wt. % $BaF_2$.

Furthermore, the optical glass of the present invention has, in addition to any of the first through third features described above, a fourth feature that it has a refractive index ($n_d$) of 1.58 to 1.70, an Abbe number ($\upsilon_d$) of 42 to 58, a glass transition point (Tg) of 470° C. or lower, and a glass deformation point (At) of 500° C. or lower.

Furthermore, the optical glass of the present invention has, in addition to any of the first through fourth features described above, a fifth feature that it is used for transfer of a fine structure.

As used herein, the transfer of a fine structure refers to a process of using a mold having a surface provided with a fine structure, which is made up of a concavo-convex pattern having a period on the order of μm to nm, to transfer the fine structure on the mold surface onto a surface of an optical glass. For the transfer of the fine structure, a precision glass molding method, or a precision transfer method called nanoimprinting may be used.

Effects of The Invention

According to the optical glass recited in claim 1, by virtue of the composition recited therein, the optical glass having favorable characteristics of a high refractive index, low dispersion, a low glass transition point, and a low deformation point can be provided. Furthermore, the optical glass would be unlikely to suffer generation of cloudiness on the surface upon molding, and is suitable for precision-mold press molding or other molding processes and also suitable for transfer of a fine structure. It is of course free of lead and thus is safe.

According to the optical glass recited in claim 2, it further contains 0.1-8 wt. % $B_2O_3$ and 0.1-10 wt. % F, and accordingly, in addition to the effects obtained by the configuration recited in claim 1, stability of the glass can be increased. Further, meltability of the glass and climate resistance of the glass can also be enhanced.

According to the optical glass recited in claim 3, by virtue of the composition recited therein, in addition to the effects obtained by the configuration recited in claim 1 or 2, the high refractive index ($n_d$) and low dispersion as the optical characteristics of the glass can further be enhanced. It is also possible to provide the optical glass which has a low deformation point, which would be unlikely to suffer generation of cloudiness, and which is suitable for precision-mold press molding or other molding processes and for transfer of a fine structure.

According to the optical glass recited in claim 4, it has a refractive index ($n_d$) of 1.58 to 1.70, an Abbe number ($\upsilon_d$) of 42 to 58, a glass transition point (Tg) of 470° C. or lower, and a glass deformation point (At) of 500° C. or lower, and accordingly, in addition to the effects obtained by the configuration recited in any of claims 1 to 3, it is possible to provide the optical glass which actually has a high refractive index, low dispersion, a low glass transition point, and a low deformation point, and which is suitable for precision molding and for transfer of a fine structure.

According to the optical glass recited in claim 5, it is used for transfer of a fine structure, and accordingly, in addition to the effects obtained by the configuration recited in any of claims 1 to 5, it is possible to obtain the optical glass, such as a lens or the like, that has a glass surface onto which a fine structure of two-dimensional concavo-convex structure having a period smaller than the wavelength of light, for example, has been transferred with accuracy. The optical glass having such a surface structure is excellent in preventing reflection of light.

BEST MODES FOR CARRYING OUT THE INVENTION

Hereinafter, components and their contents in an optical glass of the present invention will be described.

The component $P_2O_5$ forms the glass network structure. It is an essential component for imparting stability enabling fabrication to the glass.

$P_2O_5$ is contained in an amount of 25-50 wt. %. If the content is less than 25 wt. %, it will be difficult to obtain a good glass on a stable basis. On the other hand, if the content exceeds 50 wt. %, it will be difficult to obtain a glass having a sufficiently high refractive index.

The content of $P_2O_5$ is more preferably 28-45 wt. % in consideration of stability, refractive index, and other properties of the glass.

The component BaO is essential in order to improve the stability of the glass and to decrease the deformation point and the liquidus temperature.

BaO is contained in an amount of 15-35 wt. %. If the content of BaO is less than 15 wt. %, the deformation point will become high, which is unfavorable in terms of stability of the glass. If the content exceeds 35 wt. %, a satisfactorily high refractive index will not be able to be maintained.

The content of BaO is more preferably 16-33 wt. % in consideration of formability, refractive index, and other properties of the glass.

The component ZnO is essential in order to restrict devitrification upon molding of the glass and to improve formability and stability of the glass. ZnO is contained in an amount of 1-25 wt. %. If the content is less than 1 wt. %, satisfactory effects will not be able to be obtained. If the content exceeds 25 wt. %, the liquidus temperature of the glass will be increased, leading to unfavorably high glass transition point and deformation point.

The content of ZnO is more preferably 3-23 wt. %, and particularly preferably 3-20 wt. %, in consideration of glass formability, stability, glass transition point, and deformation point.

The component $Nb_2O_5$ is essential as a component that most contributes to the high refractive index of the glass.

$Nb_2O_5$ is contained in an amount of 3-10 wt. %. If the content is less than 3 wt. %, the effect of increasing the refractive index of the glass will be insufficient. On the other hand, if the content exceeds 10 wt. %, the stability of the glass will be impaired.

The content of $Nb_2O_5$ is more preferably 4-8 wt. % in consideration of the refractive index and stability of the glass.

The component $B_2O_3$ forms the glass network structure to thereby stabilize the glass. It may be contained as an optional component in an amount of 8 wt. % or less. If the content exceeds 8 wt. %, the refractive index will be decreased unfavorably.

The content of $B_2O_3$ is preferably 0.1-8 wt. %, more preferably 0.1-7 wt. %, and particularly preferably 0.1-6 wt. %, in terms of stabilization and refractive index of the glass.

The component $GeO_2$ also forms the glass network structure so as to stabilize the glass.

Adding $GeO_2$ can increase the refractive index effectively, thereby fulfilling a desired optical constant. $GeO_2$ may be contained as an optional component in an amount of 8 wt. % or less. If the content exceeds 8 wt. %, the stability of the glass will be degraded unfavorably.

The content of $GeO_2$ is preferably 1-7 wt. %, and particularly preferably 1-6 wt. %, in consideration of higher refractive index and stability of the glass.

The component $Al_2O_3$ is an effective component for restricting devitrification upon molding. It can also improve climate resistance. It may be contained as an optional component in an amount up to 1 wt. % (excluding 1 wt. %). If the content is 1 wt. % or more, the liquidus temperature of the glass will be increased, and the refractive index will be decreased unfavorably.

The content of $Al_2O_3$ is preferably 0.1-0.9 wt. %, and particularly preferably 0.5-0.8 wt. %, in consideration of climate resistance and the function of restricting devitrification.

The component $Li_2O$ is an effective component for decreasing the glass transition point and at the same time maintaining a favorable refractive index. It may be contained as an optional component in an amount of 8 wt. % or less. If the content exceeds 8 wt. %, viscosity of the glass will be decreased, thereby impairing the stability of the glass.

The content of $Li_2O$ is preferably 0.1-8 wt. %, and particularly preferably 1-7 wt. %, in consideration of the above-described functions.

The component $Na_2O$ is also an effective component for decreasing the glass transition point and at the same time maintaining a favorable refractive index. It may be contained as an optional component in an amount of 10 wt. % or less. If the content exceeds 10 wt. %, the refractive index of the glass will be decreased.

The content of $Na_2O$ is preferably 0.1-10 wt. %, and particularly preferably 1-8 wt. %, in consideration of the glass transition point and refractive index.

The component $K_2O$ is also an effective component for decreasing the glass transition point and at the same time maintaining a favorable refractive index. It may be contained as an optional component in an amount of 8 wt. % or less. If the content exceeds 8 wt. %, the refractive index of the glass will be decreased.

The content of $K_2O$ is preferably 0.1-8 wt. %, and particularly preferably 1-7 wt. %, in consideration of the glass transition point and refractive index.

It is preferable that at least two of the above-described components $Li_2O$, $Na_2O$, and $K_2O$ are contained together as the alkali metal oxides. It is effective to impart stability enabling fabrication to the glass, and decrease the glass transition point and deformation point as well, by the mixed alkali effect.

When used together, any two or all of these three components are contained in a total amount of preferably 1-10 wt. % and more preferably 2-8 wt. %.

The component CaO is effective for increasing the stability of the glass and for improving the formability thereof. It may be contained as an optional component in an amount of 10 wt. % or less. If the content exceeds 10 wt. %, the refractive index of the glass will be decreased.

The content of CaO is preferably 0.1-10 wt. %, and particularly preferably 1-8 wt. %, in consideration of stability, formability, and refractive index of the glass.

The component SrO is effective for increasing the stability of the glass and for improving the formability thereof. It may be contained as an optional component in an amount of 15 wt. % or less. If the content exceeds 15 wt. %, the refractive index of the glass will be decreased.

The content of SrO is preferably 0.1-15 wt. %, and particularly preferably 1-12 wt. %, in consideration of stability, formability, and refractive index of the glass.

The component MgO is effective for increasing the stability of the glass and for improving the formability thereof. It may be contained as an optional component in an amount of 5 wt. % or less. If the content exceeds 5 wt. %, the refractive index of the glass will be decreased.

The content of MgO is preferably 0.1-5 wt. %, and particularly preferably 1-4 wt. %, in consideration of stability, formability, and refractive index of the glass.

The component $WO_3$ is an effective component for imparting a high refractive index to the glass, and also imparting formability by a low deformation point. It may be contained as an optional component in an amount of 10 wt. % or less. If the content exceeds 10 wt. %, the stability of the glass will be impaired.

The content of $WO_3$ is preferably 0.1-10 wt. %, and particularly preferably 1-8 wt. %, in consideration of refractive index of the glass, formability, and stability of the glass.

The components $Gd_2O_3$, $Ta_2O_5$, $Y_2O_3$, and $ZrO_2$ are effective for increasing the refractive index and the Abbe number of the glass.

Each of $Gd_2O_3$ and $Ta_2O_5$ may be contained as an optional component in an amount of 8 wt. % or less. If the content exceeds 8 wt. %, the stability of the glass will be impaired.

The content of each of $Gd_2O_3$ and $Ta_2O_5$ is preferably 0.5-8 wt. %, and particularly preferably 1-7 wt. %.

$Y_2O_3$ may be contained as an optional component in an amount of 5 wt. % or less. If the content exceeds 5 wt. %, the stability of the glass will be impaired.

The content of $Y_2O_3$ is preferably 0.1-5 wt. %.

$ZrO_2$ may be contained as an optional component in an amount of 3 wt. % or less. If the content exceeds 3 wt. %, the stability of the glass will be impaired.

The content of $ZrO_2$ is preferably 0.1-2 wt. %.

The components $LiF$, $NaF$, $ZnF_2$, and $BaF_2$ are effective for improving the meltability of the glass and decreasing the deformation point and liquidus temperature. They are also effective for improving the climate resistance of the glass.

Each of LiF and NaF may be contained as an optional component in an amount of 10 wt. % or less. If the content exceeds 10 wt. %, the stability of the glass will be impaired.

The content of each of LiF and NaF is preferably 0.5-10 wt. %, and particularly preferably 1-8 wt. %.

Each of $ZnF_2$ and $BaF_2$ may be contained as an optional component in an amount of 15 wt. % or less. If the content exceeds 15 wt. %, the stability of the glass will be impaired.

The content of each of $ZnF_2$ and $BaF_2$ is preferably 0.5-15 wt. %, and particularly preferably 1-13 wt. %.

The component F contained in the glass is an effective component for improving the meltability of the glass and for improving the climate resistance of the glass. It may be contained as an optional component in an amount of 10 wt. % or less. If the content exceeds 10 wt. %, the stability of the glass will be impaired.

The content of F is preferably 0.1-10 wt. %, and more preferably 0.1-8 wt. %, in consideration of meltability, climate resistance, and stability of the glass.

It is noted that it is preferable not to add $Yb_2O_3$ because it has a strong absorption band in the 950 to 1000 nm region.

Furthermore, while $Bi_2O_3$ is effective in decreasing the deformation point of the glass, if it is contained in a large amount, the glass would be likely to be colored. Thus, in the case of adding $Bi_2O_3$, the content is restricted to 5 wt. % or less.

For the raw materials for fabricating the optical glass of an embodiment, $LiPO_3$, $NaPO_3$, $KPO_3$, $Al(PO_3)_3$, $Ba(PO_3)_2$, and others may be used for the component $P_2O_5$, and $H_3BO_3$, $B_2O_3$, and others may be used for the component $B_2O_3$. For the other components, any raw materials commonly used for the optical glass, such as oxides, carbonates, nitrates, and others, may be used.

When these raw materials are mixed in the above-described component ranges, melted at 900° C. to 1300° C., homogenized through fining (gas removal), stirring, and other processing, and poured into the mold and cooled gradually, then an optical glass of the present invention can be obtained which has no color, a high refractive index, and a low deformation point, and which is transparent, homogeneous, and excellent in processability.

The following (1), (2), and (3) are specific examples of highly preferable compositions for achieving the optical glasses that have a high refractive index, low dispersion, and a low deformation point, and that can solve the problems of the present invention. These optical glasses are superior in chemical durability as well.

(1) A glass composed of: 0.1-3 wt. % $B_2O_3$, 30-36 wt. % $P_2O_5$, 1-6 wt. % $Li_2O$, 1-5 wt. % $Na_2O$, 28-35 wt. % BaO, 10-15 wt. % ZnO, 0.5-4 wt. % $ZnF_2$, 0.5-5 wt. % $Gd_2O_3$, 5-10 wt. % $Nb_2O_5$, and 0.5-3 wt. % $Ta_2O_5$.

(2) A glass composed of: 0.1-3 wt. % $B_2O_3$, 30-36 wt. % $P_2O_5$, 1-6 wt. % $Li_2O$, 1-5 wt. % $Na_2O$, 28-35 wt. % BaO, 10-15 wt. % ZnO, 0.5-4 wt. % $ZnF_2$, 0.5-5 wt. % $Gd_2O_3$, 5-10 wt. % $Nb_2O_5$, 0.1-3 wt. % $Ta_2O_5$, and 0.1-3 wt. % $ZrO_2$.

(3) A glass composed of: 0.1-3 wt. % $B_2O_3$, 30-36 wt. % $P_2O_5$, 1-6 wt. % $Li_2O$, 1-5 wt. % $Na_2O$, 28-35 wt. % BaO, 10-15 wt. % ZnO, 0.5-4 wt. % $ZnF_2$, 0.5-5 wt. % $Gd_2O_3$, 5-10 wt. % $Nb_2O_5$, and 0.1-3 wt. % $ZrO_2$.

EXAMPLES

Hereinafter, the present invention will further be described by giving examples, although the present invention is not restricted to the examples by any means.

Raw materials were prepared and mixed to achieve the compositions of Examples 1 to 22 and Comparative Examples 1 to 5 shown in Tables 1 to 4. The mixed raw materials for each composition were introduced into a platinum crucible, and melted in an electric furnace at 900° C. to 1300° C. The melt was then poured into a mold, and allowed to cool slowly, whereby an optical glass was obtained.

For each of the obtained optical glasses, a refractive index ($n_d$), an Abbe number ($\upsilon_d$), a glass transition point (Tg), and a deformation point (At) were measured. Moreover, a microscope was used to check for any defects such as cloudiness.

Next, each glass plate was cut into dice to obtain a plurality of cut pieces of the same size. The molded surfaces of the cut pieces were subjected to mirror polishing, and the samples were rinsed to obtain glass preforms for use in press molding.

The glass preform for molding was introduced into a press molding machine having an upper core and a lower core provided with rare metal-type mold release films. The glass preform was heated to a temperature near the deformation point (At) under the $N_2$ gas or vacuum atmosphere, and applied with pressure for press molding. It was then cooled before being taken out as a press-molded product. The molded surface of the press-molded product was observed (appearance), and each core surface that came into contact with the glass was also observed (core surface). Cloudiness on the core surface, if any, is due to the components volatilized from the glass, indicating the presence of fine roughness on the press-molded surface.

It is noted that Comparative Example 1 has the composition identical to that of the glass according to Example 14 in Patent Document 1. Comparative Example 2 has the composition identical to that of the glass according to Examples 1-3 in Patent Document 2. Comparative Example 3 has the organization identical to that of the glass according to Example 1 in Patent Document 3. Comparative Example 4 has the composition identical to that of the glass according to Example 2 in Patent Document 8. Comparative Example 5 has the composition identical to that of the glass according to Example 1 in Patent Document 9.

For each of the Examples and Comparative Examples, the refractive index ($n_d$) and the Abbe number ($\upsilon_d$) were measured using a refractometer (available from Kalnew Co., Ltd.; KPR-200).

For measuring the glass transition point (Tg) and the deformation point (At), a rod-shaped sample having a length of 15-20 mm and a diameter (side) of 3-5 mm was heated, with the temperature increased at a constant rate of 5° C. per minute, during which elongation and temperature of the sample were measured to obtain a thermal expansion curve. The glass transition point and the deformation point were calculated from the thermal expansion curve.

For evaluation of the climate resistance, the obtained glass was processed into a piece of about 10 mm×10 mm×2 mm (thickness), and the both surfaces of the 10×10 piece were subjected to mirror polishing. The polished glass was held in a constant temperature and humidity chamber of about 65° C. and about 90%, and the surface conditions were observed at regular time intervals. The climate resistance was evaluated in accordance with the time when cloudiness or spots were observed on the glass surface.

The measurement results are shown in Tables 1 to 4.

TABLE 1

| | | Example 1 | Example 2 | Example 3 | Example 4 | Example 5 | Example 6 | Example 7 |
|---|---|---|---|---|---|---|---|---|
| Glass Composition (wt. %) | $SiO_2$ | | | | | | | |
| | $B_2O_3$ | 6.7 | | | | | | |
| | $GeO_2$ | | | | 8.0 | | | |
| | $Al_2O_3$ | | | | | | | |
| | $P_2O_5$ | 33.1 | 36.8 | 40.3 | 39.2 | 39.3 | 36.0 | 37.6 |
| | $Li_2O$ | 5.8 | | 7.0 | 5.6 | 1.5 | 3.9 | 4.1 |
| | LiF | | | | | | 9.0 | |
| | $Na_2O$ | | 9.9 | | | 7.5 | | |
| | NaF | | | | | | | 9.5 |
| | $K_2O$ | | | | | | | |
| | MgO | | | | | | | |
| | CaO | | | | | 10.0 | | |
| | SrO | | 14.4 | | | | | |
| | BaO | 33.6 | 15.4 | 27.4 | 18.8 | 16.0 | 24.4 | 25.6 |
| | $BaF_2$ | | | | | | | |
| | ZnO | 5.5 | 9.4 | 14.5 | 11.5 | 9.8 | 15.1 | 15.8 |
| | $ZnF_2$ | | | | | | | |
| | $Y_2O_3$ | | | | | | 4.5 | |
| | $Gd_2O_3$ | 5.8 | 6.5 | | 2.3 | 6.1 | | |
| | $Sb_2O_3$ | | | | | | | |
| | $TiO_2$ | | | | | | | |
| | $ZrO_2$ | | | | | | | |
| | $Lu_2O_3$ | | | | | | | |
| | $Nb_2O_5$ | 9.5 | 7.7 | 4.4 | 4.9 | 9.8 | 6.1 | 6.3 |
| | $Ta_2O_5$ | | | 6.4 | | | 1.0 | 1.0 |
| | $WO_3$ | | | | 9.6 | | | |
| | $Bi_2O_3$ | | | | | | | |
| Refractive Index $n_d$ | | 1.65630 | 1.62562 | 1.63341 | 1.64892 | 1.63464 | 1.60862 | 1.60283 |
| Abbe Number $v_d$ | | 50.0 | 50.6 | 51.9 | 48.8 | 49.3 | 56.0 | 53.6 |
| Glass Transition Point Tg (° C.) | | 461 | 438 | 389 | 425 | 424 | 314 | 305 |
| Deformation Point At (° C.) | | 497 | 477 | 413 | 457 | 464 | 343 | 338 |
| Amount of F (wt. %) | | 0.0 | 0.0 | 0.0 | 0.0 | 0.0 | 6.6 | 4.3 |
| Climate Resistance (65° C., 90%) | | — | — | — | — | — | — | — |

TABLE 2

| | | Example 8 | Example 9 | Example 10 | Example 11 | Example 12 | Example 13 | Example 14 |
|---|---|---|---|---|---|---|---|---|
| Glass Composition (wt. %) | $SiO_2$ | | | | | | | |
| | $B_2O_3$ | | 1.8 | 1.0 | 1.0 | | | |
| | $GeO_2$ | | | | | 7.8 | 3.5 | |
| | $Al_2O_3$ | | | | | | 1.0 | 1.0 |
| | $P_2O_5$ | 37.7 | 31.1 | 34.1 | 33.9 | 32.6 | 38.4 | 35.6 |
| | $Li_2O$ | 4.1 | 5.0 | 5.4 | | | 2.2 | 2.8 |
| | LiF | | | | 1.0 | | | |
| | $Na_2O$ | | | | 9.2 | 7.0 | 2.8 | 2.7 |
| | NaF | | | | 1.0 | | | |
| | $K_2O$ | | | | | | 2.8 | |
| | MgO | | | | | | | |
| | CaO | | | | | | | |
| | SrO | | | | | | | |
| | BaO | 25.6 | 29.8 | 35.0 | 31.6 | 24.7 | 20.2 | 20.2 |
| | $BaF_2$ | 9.4 | | 1.0 | | | | |
| | ZnO | 15.9 | | 1.0 | 6.8 | 6.7 | 11.5 | 18.6 | 17.5 |
| | $ZnF_2$ | | 7.8 | 1.0 | | | 4.7 | 12.0 |
| | $Y_2O_3$ | | | | | | | |
| | $Gd_2O_3$ | | 4.9 | 5.4 | 2.3 | 2.3 | 1.9 | 1.7 |
| | $Sb_2O_3$ | | | | | | | |

TABLE 2-continued

|  |  | Example 8 | Example 9 | Example 10 | Example 11 | Example 12 | Example 13 | Example 14 |
|---|---|---|---|---|---|---|---|---|
|  | $TiO_2$ |  |  |  |  |  |  |  |
|  | $ZrO_2$ |  |  |  |  |  |  |  |
|  | $Lu_2O_3$ |  |  |  |  |  |  |  |
|  | $Nb_2O_5$ | 6.4 | 9.3 | 6.8 | 6.7 | 4.9 | 4.0 | 6.6 |
|  | $Ta_2O_5$ | 1.0 |  |  |  |  |  |  |
|  | $WO_3$ |  | 9.3 | 3.4 | 6.7 | 9.3 |  |  |
|  | $Bi_2O_3$ |  |  |  |  |  |  |  |
| Refractive Index $n_d$ |  | 1.63250 | 1.68770 | 1.66184 | 1.63082 | 1.65109 | 1.61838 | 1.62703 |
| Abbe Number $v_d$ |  | 52.6 | 44.0 | 49.7 | 48.8 | 46.6 | 54.5 | 52.0 |
| Glass Transition Point Tg (° C.) |  | 363 | 451 | 441 | 390 | 456 | 391 | 356 |
| Deformation Point At (° C.) |  | 393 | 488 | 474 | 433 | 495 | 427 | 389 |
| Amount of F (wt. %) |  | 2.0 | 2.9 | 0.6 | 1.2 | 0.0 | 1.7 | 4.4 |
| Climate Resistance (65° C., 90%) |  | — | — | — | — | — | — | — |

TABLE 3

|  |  | Example 15 | Example 16 | Example 17 | Example 18 | Example 19 | Example 20 | Example 21 |
|---|---|---|---|---|---|---|---|---|
| Glass Composition (wt. %) | $SiO_2$ |  |  |  |  |  |  |  |
|  | $B_2O_3$ |  | 1.0 | 0.8 | 3.3 | 0.6 | 0.6 | 0.6 |
|  | $GeO_2$ |  |  |  |  |  |  |  |
|  | $Al_2O_3$ |  |  |  |  |  |  |  |
|  | $P_2O_5$ | 38.3 | 33.5 | 35.0 | 28.2 | 34.6 | 34.0 | 33.1 |
|  | $Li_2O$ | 4.8 | 5.3 | 2.8 | 5.6 | 5.3 | 2.5 | 2.4 |
|  | LiF |  |  |  |  |  |  |  |
|  | $Na_2O$ |  |  |  |  |  | 5.1 |  |
|  | NaF |  |  |  |  |  |  |  |
|  | $K_2O$ |  |  |  |  |  |  | 7.6 |
|  | MgO |  | 4.6 |  |  |  |  |  |
|  | CaO |  |  |  |  |  |  |  |
|  | SrO |  |  |  |  |  |  |  |
|  | BaO | 26.0 | 34.4 | 29.5 | 29.0 | 32.2 | 31.6 | 30.8 |
|  | $BaF_2$ | 4.0 | 1.7 | 13.4 |  |  |  |  |
|  | ZnO | 18.4 | 6.7 | 5.4 | 3.9 | 12.5 | 12.0 | 11.7 |
|  | $ZnF_2$ |  | 1.0 | 0.8 | 9.7 | 1.8 | 1.7 | 1.7 |
|  | $Y_2O_3$ |  |  |  |  |  |  |  |
|  | $Gd_2O_3$ |  | 1.7 | 4.3 | 5.0 | 3.1 | 3.0 | 2.9 |
|  | $Sb_2O_3$ |  |  |  |  |  |  |  |
|  | $TiO_2$ |  |  |  |  |  |  |  |
|  | $ZrO_2$ |  |  |  |  | 1.1 |  |  |
|  | $Lu_2O_3$ |  |  |  |  |  |  |  |
|  | $Nb_2O_5$ | 7.4 | 6.7 | 5.4 | 7.7 | 7.4 | 8.0 | 7.8 |
|  | $Ta_2O_5$ | 1.2 |  |  |  | 1.6 | 1.5 | 1.5 |
|  | $WO_3$ |  | 3.3 | 2.7 | 7.7 |  |  |  |
|  | $Bi_2O_3$ |  |  |  |  |  |  |  |
| Refractive Index $n_d$ |  | 1.64382 | 1.65474 | 1.64548 | 1.67174 | 1.66076 | 1.64908 | 1.64026 |
| Abbe Number $v_d$ |  | 50.5 | 50.8 | 53.2 | 47.3 | 49.4 | 48.8 | 48.8 |
| Glass Transition Point Tg (° C.) |  | 385 | 440 | 408 | 405 | 431 | 413 | 435 |
| Deformation Point At (° C.) |  | 416 | 479 | 445 | 442 | 465 | 449 | 477 |
| Amount of F (wt. %) |  | 0.9 | 0.7 | 3.2 | 3.5 | 0.6 | 0.6 | 0.6 |
| Climate Resistance (65° C., 90%) |  | — | — | — | — | — | 80 h | 80 h |

TABLE 4

|  |  | Example 22 | Comparative Example 1 | Comparative Example 2 | Comparative Example 3 | Comparative Example 4 | Comparative Example 5 |
|---|---|---|---|---|---|---|---|
| Glass Composition (wt. %) | $SiO_2$ |  |  |  | 0.3 |  |  |
|  | $B_2O_3$ |  |  |  | 2.0 | 5.0 | 8.0 |
|  | $GeO_2$ |  |  |  |  |  |  |
|  | $Al_2O_3$ |  |  |  |  | 2.4 | 0.5 |
|  | $P_2O_5$ | 44.0 | 37.0 | 41.2 | 34.6 | 40.4 | 37.8 |
|  | $Li_2O$ | 6.2 | 3.0 | 3.7 | 3.0 | 2.8 |  |
|  | LiF |  |  |  |  |  |  |
|  | $Na_2O$ | 3.0 |  | 6.8 |  | 9.9 |  |

TABLE 4-continued

|  | | Example 22 | Comparative Example 1 | Comparative Example 2 | Comparative Example 3 | Comparative Example 4 | Comparative Example 5 |
|---|---|---|---|---|---|---|---|
| | NaF | | | | | | |
| | $K_2O$ | | | 3.7 | 1.5 | | |
| | MgO | | | | | 3.8 | 1.2 |
| | CaO | | | | | 5.3 | 2.0 |
| | SrO | | 4.0 | | | | |
| | BaO | 19.5 | 35.0 | 27.5 | 11.3 | 36.4 | 39.9 |
| | $BaF_2$ | | | | | | |
| | ZnO | 23.3 | 12.0 | 7.6 | | 3.9 | 8.6 |
| | $ZnF_2$ | | | | | | |
| | $Y_2O_3$ | | | | | | |
| | $Gd_2O_3$ | | | | | | |
| | $Sb_2O_3$ | | | | 0.1 | | |
| | $TiO_2$ | | | | 3.5 | | |
| | $ZrO_2$ | | | | | | |
| | $Lu_2O_3$ | | 3.0 | | | | |
| | $Nb_2O_5$ | 3.9 | 6.0 | 6.6 | 29.8 | | |
| | $Ta_2O_5$ | | | | | | |
| | $WO_3$ | | | | 4.0 | | 2.0 |
| | $Bi_2O_3$ | | | 2.9 | | | |
| Refractive Index $n_d$ | | 1.60756 | 1.64823 | 1.60720 | 1.71510 | 1.61290 | 1.61893 |
| Abbe Number $\nu_d$ | | 55.2 | 52.5 | 51.2 | 30.7 | 64.2 | 62.8 |
| Glass Transition Point Tg (° C.) | | 346 | 446 | 350 | 470 | 500 | 583 |
| Deformation Point At (° C.) | | 370 | 479 | 384 | 512 | 541 | 621 |
| Amount of F (wt. %) | | 0.0 | 0.0 | 0.0 | 0.0 | 0.0 | 0.0 |
| Climate Resistance (65° C., 90%) | | — | 32 h | 48 h | — | — | — |

As apparent from Tables 1 to 3, the glasses according to the Examples of the present invention each have optical constants sufficient for the optical glass, with a high refractive index ($n_d$) of 1.58 or more as well as a high Abbe number ($\nu_d$). Furthermore, generation of cloudiness on the molded surface upon molding was satisfactorily restricted.

These results show that the optical glass of the present invention has favorable characteristics allowing mass production.

Furthermore, the glasses of the Examples of the present invention each have a deformation point (At) falling within a relatively low temperature range of 500° C. or lower, which facilitates molding thereof. It is apparent from the foregoing that the glass of the present invention is suitable for precision-mold press molding.

On the other hand, the climate resistance test showed that in each of the glasses of Comparative Examples 1 and 2, cloudiness began to appear on the surface within 50 hours. The glasses of Comparative Examples 3 to 5 each have a high deformation point (At), causing severe deterioration of the surface of the mold.

Industrial Applicability

The optical glass according to the present invention has industrial applications as an optical glass which has a high refractive index, a high Abbe number, a low glass transition temperature, and a low deformation point, which would be unlikely to suffer generation of cloudiness upon precision-mold press molding and is excellent in resistance to devitrification, and which is particularly suitable for forming an aspherical lens and the like and is also suitable for mass production.

What is claimed is:

1. A $P_2O_5$—BaO—ZnO—$Nb_2O_5$ type optical glass, containing 25-50 wt. % $P_2O_5$, 16-35 wt. % BaO, 1-25 wt. % ZnO, 3-10 wt. % $Nb_2O_5$, 0.1-8 wt. % $B_2O_3$ and 0.1-10 wt. % F.

2. The optical glass according to claim 1, further containing at least one of: 0-8 wt. % $GeO_2$, 0-1 wt. % $Al_2O_3$ (excluding 1 wt. %), 0-8 wt. % $Li_2O$, 0-10 wt. % $Na_2O$, 0-8 wt. % $K_2O$, 0-10 wt. % CaO, 0-15 wt. % SrO, 0-5 wt. % MgO, 0-10 wt. % $WO_3$, 0-8 wt. % $Gd_2O_3$, 0-8 wt. % $Ta_2O_5$, 0-5 wt. % $Y_2O_3$, 0-3 wt. % $ZrO_2$, 0-10 wt. % LiF, 0-10 wt. % NaF, 0-15 wt. % $ZnF_2$, and 0-15 wt. % $BaF_2$.

3. The optical glass according to claim 1, having a refractive index ($n_d$) of 1.58 to 1.70, an Abbe number ($n_d$) of 42 to 58, a glass transition point (Tg) of 470° C. or lower, and a glass deformation point (At) of 500° C. or lower.

4. The optical glass according to claim 1, used for transfer of a fine structure.

* * * * *